United States Patent
Ihm et al.

(10) Patent No.: US 8,144,795 B2
(45) Date of Patent: Mar. 27, 2012

(54) METHOD FOR ENCODING SPACE-TIME CODES IN A WIRELESS COMMUNICATION SYSTEM HAVING MULTIPLE ANTENNAS

(75) Inventors: Bin Chul Ihm, Anyang-si (KR); Moon Il Lee, Yongin-si (KR); Jin Young Chun, Seoul (KR); Wook Bong Lee, Gyeonggi-do (KR); Jae Won Chang, Suwon-si (KR); Jin Hyuk Jung, Ansan-si (KR)

(73) Assignee: LG Electronics Inc., Seoul (KR)

( * ) Notice: Subject to any disclaimer, the term of this patent is extended or adjusted under 35 U.S.C. 154(b) by 800 days.

(21) Appl. No.: 12/091,719

(22) PCT Filed: Oct. 26, 2006

(86) PCT No.: PCT/KR2006/004396
§ 371 (c)(1),
(2), (4) Date: Aug. 6, 2008

(87) PCT Pub. No.: WO2007/049926
PCT Pub. Date: May 3, 2007

(65) Prior Publication Data
US 2008/0317157 A1  Dec. 25, 2008

Related U.S. Application Data

(60) Provisional application No. 60/736,086, filed on Nov. 10, 2005, provisional application No. 60/730,629, filed on Oct. 26, 2005.

(30) Foreign Application Priority Data

Mar. 30, 2006 (KR) .................. 10-2006-0029058

(51) Int. Cl.
*H04B 7/14* (2006.01)
(52) U.S. Cl. ........................................................ 375/267
(58) Field of Classification Search .................. 375/260, 375/267, 295, 299; 455/500, 101, 103
See application file for complete search history.

(56) References Cited

U.S. PATENT DOCUMENTS

| | | | |
|---|---|---|---|
| 7,327,795 B2 * | 2/2008 | Oprea | 375/260 |
| 7,403,748 B1 * | 7/2008 | Keskitalo et al. | 455/101 |
| 2004/0066761 A1 | 4/2004 | Giannakis et al. | |
| 2004/0202256 A1 | 10/2004 | Giannakis et al. | |
| 2005/0070323 A1 * | 3/2005 | Lozano et al. | 455/522 |
| 2007/0297529 A1 * | 12/2007 | Zhou et al. | 375/267 |

FOREIGN PATENT DOCUMENTS

| WO | 01/76094 | 10/2001 |
|---|---|---|
| WO | 02/080375 | 10/2002 |

* cited by examiner

*Primary Examiner* — Khanh C Tran
(74) *Attorney, Agent, or Firm* — Lee, Hong, Degerman, Kang & Waimey

(57) ABSTRACT

A method of transmitting space-time coded data in a wireless communication system having a plurality of antennas is disclosed. More specifically, the method includes allocating data symbols combined with complex weights to at least two transmit antennas during at least one specified time slot, and transmitting the data symbols combined with complex weights to a receiving end via the at least two transmit antennas during the at least one specified time slot.

20 Claims, 6 Drawing Sheets

METHOD FOR ENCODING SPACE-TIME CODES IN A WIRELESS COMMUNICATION SYSTEM HAVING MULTIPLE ANTENNAS

This application is a national stage application of international application no. PCT/KR2006/004396, filed on Oct. 26, 2006, which claims the benefit and right of priority to U.S. Provisional Application No. 60/730,629, filed on Oct. 26, 2005, U.S. Provisional Application No. 60/736,086, filed on Nov. 10, 2005 and Korean Application No. 10-2006-0029058, filed on Mar. 30, 2006.

TECHNICAL FIELD

The present invention relates to a method of encoding spaced time codes and more particularly, to a method of encoding space time codes in a wireless communication system having multiple antennas.

BACKGROUND ART

With the widespread of telecommunication services coupled with the introduction of various multimedia and high quality services, demands for communication services are increasing rapidly. In wireless communication systems, frequency resources are limited and shared with other users. In order to actively respond to the demands, the capacity of the communication system plays an important role. As such, it is important to discover available frequency bandwidth and/or improve efficiency in using existing frequency resources. To address this limited frequency resources problem, researches related to spatial-time domain encoding are taking place to improve wireless resource efficiency. For example, researches related to systems having multiple antennas both at the transmitting and the receiving sides are actively being researched so that communication reliability can be increased using existing resources through diversity gain and/or using parallel transmissions to increase transmission capacity.

FIG. 1 illustrates a structural diagram of a communication device for transmission/reception. More specifically in FIG. 1, the transmitting end includes a channel encoder 101, a mapper 102, a serial/parallel (S/P) converter 103, a multiple antenna encoder 104, and multiple transmit antennas 105.

The channel encoder 101 reduces noise effect by adding repeated bits (e.g., cyclic redundancy bits) to the data bits. The mapper 102 performs constellation mapping where the data bits are allocated/mapped into data symbols. The S/P converter 103 converts serially inputted data into parallel data. The multiple antenna encoder 104 encodes the data symbols into time-space signals. The multiple antennas 105 transmit the time-space encoded signals to a plurality of channels.

The receiving end includes multiple receiving antennas 106, a multiple antenna decoder 107, a parallel/serial (P/S) converter 108, a demapper 109, and a channel decoder 110. The multiple receiving antennas 106 receive signals via the plurality of channels. The multiple antenna decoder 107 decodes time-space signals encoded by the multiple antenna encoder 104 and converts the decoded signals into data symbols. Further, the P/S converter 108 converts the parallel symbols into serial symbols. The demapper 109 converts the serial data symbols to bits. Lastly, the channel decoder decodes the channel codes processed through channel encoder 101 and then estimates the data.

As discussed above, the multiple antenna encoder 104 performs space-time coding. Table 1 shows space-time codes derived from two or four transmit antennas.

TABLE 1

| Scheme | | Rate | Number of Antennas | Rank (Tx) | dp.min (minimum product distance) (QPSK) |
|---|---|---|---|---|---|
| (1) | $\frac{1}{\sqrt{2}}\begin{bmatrix} S_1 & -S_2^* \\ S_2 & S_1 \end{bmatrix}$ | 1 | 2 | 1 | 1 |
| (2) | $\frac{1}{\sqrt{2}}\begin{bmatrix} S_1 \\ S_2 \end{bmatrix}$ | 2 | 2 | 1 | 1 |
| (3) | $\frac{1}{\sqrt{2(1+r^2)}}\begin{bmatrix} S_1 + jr \cdot S_4 & r \cdot S_2 + S_3 \\ S_2 - r \cdot S_3 & jr \cdot S_1 + S_4 \end{bmatrix}, r = \sqrt{5} \pm \frac{1}{2}$ | 2 | 2 | 2 | 0.2 |
| (4) | $\frac{1}{2}\begin{bmatrix} S_1 & S_2 & S_3 & S_4 \\ S_2^* & -S_1^* & S_4^* & -S_3^* \\ S_3 & -S_4 & -S_1 & S_2 \\ S_4^* & S_3^* & -S_2^* & -S_1^* \end{bmatrix}$ | 1 | 4 | 2 | 4 |
| (5) | $\frac{1}{\sqrt{2}}\begin{bmatrix} S_1 & S_2 & 0 & 0 \\ -S_2^* & S_1^* & 0 & 0 \\ 0 & 0 & S_3 & S_4 \\ 0 & 0 & -S_3^* & S_3^* \end{bmatrix}$ | 1 | 4 | 2 | 1 |
| (6) | $\frac{1}{2}\begin{bmatrix} S_1 & -S_2^* & S_5 & S_6 \\ S_2^* & S_1^* & S_6 & S_5^* \\ S_3 & -S_4^* & S_7 & -S_8^* \\ S_4 & S_3^* & S_8 & S_7^* \end{bmatrix}$ | 2 | 4 | 2 | 1 |

The space-time codes of Table 1, namely, (1), (2), and (3), are space-time codes related to two (2) transmit antennas whereas (4), (5), and (6) are space-time codes related to four (4) transmit antennas.

The use of multiple antennas was proposed for the purposes of increasing capacity, throughput, and/or coverage of the wireless communication system. The multiple antennas are used to employ schemes such as a spatial division multiplexing (SDM or SM) and a space-time coding (STC). More specifically, the SM scheme sends different data to each of the multiple antennas so as to maximize the transmission rate. Further, the STC scheme encodes the symbols across the spatial domain (e.g., antennas) and the time domain to attain diversity gain as well as coding gain so as to increase link level capability. In addition, a generalized form of the combination of SM and STC schemes is a linear dispersion coding (LDC). The LDC matrix can be used in encoding/decoding operations of the multiple antennas, and at the same time, in representing various techniques of the multiple antennas.

The multiple antenna encoding technique according to the LDC matrix can be represented by the following equation.

$$S = \sum_{q=1}^{Q} S_q M_q \qquad \text{[Equation 1]}$$

In Equation 1, Q denotes a number of data transmitted during a LDC interval, T denotes the LDC interval, $S_q$ denotes $q^{th}$ transmission data and $S_q = \alpha_q + j^*\beta_q$, $M_q$ denotes is a dispersion matrix, having a size of $T \times N_t$, which is multiplied to the $q^{th}$ transmission data, and S denotes a transmission matrix. Here, $i^{th}$ column of the S transmission matrix represents symbols that are transmitted during the $i^{th}$ time period or time slot, and $j^{th}$ row represents symbols that are transmitted by the $j^{th}$ antenna.

More generally, if each of an actual part ($\alpha_q$) and an imaginary part ($\beta_q$) of $S_q$ is spread across the space-time plane by different dispersion matrix, this can be represented by Equation 2.

$$S = \sum_{q=1}^{Q} (\alpha_q A_q + j\beta_q B_q) \qquad \text{[Equation 2]}$$

In Equation 2, $A_q$ and $B_q$ each denotes a dispersion matrix, having a size of $T \times N_t$, which is respectively multiplied to the actual part and the imaginary part of $S_q$.

If the data symbols are transmitted via the transmit antennas according to the scheme(s) as described above, the receiving signals received by the receiving antennas can be expressed as follows. If the receiving signals are multiplied to $S_q$ by the same or identical LDC matrix, then it can be expressed according to the following equation.

$$\begin{bmatrix} Y_1 \\ \vdots \\ Y_{Nr} \end{bmatrix} = H\chi \begin{bmatrix} S_1 \\ \vdots \\ S_Q \end{bmatrix} + \begin{bmatrix} n_1 \\ \vdots \\ n_{Nr} \end{bmatrix} \qquad \text{[Equation 3]}$$

An equivalent channel response can be expressed by Equation 4 if the LDC, as shown in Equation 1, is applied.

$$H = I_r \otimes H, \chi = [\text{vec}(M_0)\text{vec}(M_1) \ldots \text{vec}(M_Q)] \qquad \text{[Equation 4]}$$

In Equations 3 and 4, Nr denotes a number of receiving antennas, $y_{Nr}$ denotes a signal value of the $Nr^{th}$ receiving antenna, $n_{Nr}$ denotes noise from the $Nr^{th}$ receiving antenna, H denotes the equivalent channel response, and H denotes a channel response matrix having a size of $N_r \times N_t$.

If the receiving signal is applied the LDC of Equation 2, then the receiving signal can be expressed as follows.

$$\begin{bmatrix} Y_{R,1} \\ Y_{I,1} \\ \vdots \\ Y_{R,Nr} \\ Y_{I,Nr} \end{bmatrix} = H \begin{bmatrix} \alpha_1 \\ \beta_1 \\ \vdots \\ \alpha_Q \\ \beta_Q \end{bmatrix} + \begin{bmatrix} n_{R,1} \\ n_{I,1} \\ \vdots \\ n_{R,Nr} \\ n_{I,Nr} \end{bmatrix} \qquad \text{[Equation 5]}$$

In Equation 5, R (subscript) denotes the real part of the signal, and I (subscript) denotes the imaginary part of the signal. Here, the equivalent channel response can be expressed as shown in Equation 6.

$$H\begin{bmatrix} A_1 h_1 & B_1 h_1 & \ldots & A_Q h_1 & B_1 h_1 \\ \vdots & \vdots & \ddots & \vdots & \vdots \\ A_1 h_{Nr} & B_1 h_{Nr} & \ldots & A_Q h_{Nr} & B_Q h_{Nr} \end{bmatrix}, \qquad \text{[Equation 6]}$$

$$A_q = \begin{bmatrix} A_{R,q} & -A_{I,q} \\ A_{I,q} & A_{R,q} \end{bmatrix},$$

$$B_q = \begin{bmatrix} -B_{I,q} & -B_{R,q} \\ B_{R,q} & -B_{I,q} \end{bmatrix},$$

$$h_n = \begin{bmatrix} h_{R,n} \\ h_{I,n} \end{bmatrix}$$

In Equation 6, $h_{R,n}$ denotes the real parts of the channel response vector received via $n^{th}$ receiving antenna, and $h_{I,n}$ denotes the imaginary parts of the channel response vector received via $n^{th}$ receiving antenna. In other words, the multiple antenna decoding is a process by which transmitted signals are decoded using equations such as Equation 3 or Equation 5. To put differently, the multiple antenna decoding is a process of estimating $S_q$ or $\alpha_q$ and $\beta_q$.

In addressing capacity problems, a multiple input multiple output (MIMO) can be used increase transmission capacity of the wireless communication system. Further, a space-time block coding, proposed by Alamouti, (*A Simple Transmit Diversity Technique for Wireless Communications*, IEEE JSAC, vol. 16, no. 8, October 1998) is an exemplary transmit diversity technique which uses a plurality of transmitting/receiving antennas to overcome fading in wireless channels. The Alamouti proposed scheme uses two (2) transmit antennas, and the diversity order equals a product of a number of transmit antennas and a number of receiving antennas. Here, the Alamouti proposed scheme transmits two (2) data symbols during two (2) time slots via two (2) transmit antennas, and as a result, a transmit rate (spatial multiplexing rate) is only 1. Consequently, the spatial multiplexing gain cannot be attained regardless how many receiving antennas are available. Here, the Alamouti proposed scheme does not discuss the transmit techniques associated with three (3) or more transmit antennas.

In addition, Bell Laboratories introduced another spatial multiplexing technique known as a vertical bell laboratories layered space-time (V-BLAST) system (*Detection Algorithm and Initial Laboratory Results Using V-BLAST Space-Time*

Communication Architecture, IEEE, Vol. 35, No. 1, pp. 14-16, 1999). In this technique, each transmit antenna transmits independent signals simultaneously using the same transmit power and rate. At the receiving end, the transmitted signals are processed through detection ordering, interference nulling, and interference cancellation procedures. By using the V-BLAST system, unnecessary interference signals can be eliminated or reduced thus increasing a signal-to-noise ratio (SNR). This technique is useful if the number of receiving antennas is equal or greater than the number of transmit antennas since independent data signals, corresponding to the number of transmit antennas, can be simultaneously transmitted attaining a maximum spatial multiplexing gain. Here, a possible drawback is that there has to be more receiving antennas than the transmit antennas. Moreover, if the channel condition is bad and thus the received signal is unsuccessfully decoded, detecting and decoding subsequent signal is likely to be affected as well affecting the system performance.

Further, different from the two techniques discussed above, Yao and Wornwell (hereafter, "Yao") proposed another spatial multiplexing technique called tilted-quadrature amplitude multiplexing (QAM) (*Structured Space-Time Block Codes with Optimal Diversity-Multiplexing Tradeoff and Minimum Delay*, Globecom, pp. 1941-1945, 2003). This technique is a full diversity and full rate (FDFR) STC which complements an optimal diversity-multiplexing tradeoff proposed by Zheng and Tse. Yao's technique is used in a system having two (2) transmit antennas and two (2) receiving antennas where a short space-time block code has a minimum code length of 2. Further, the technique employs QAM constellation rotation to attain spatial multiplexing gain as well as full diversity gain. However, shortcomings with this technique is that coding gain is not fully realized since the rotation is a simple rotation of the signal, and the technique is applied and limited to systems having two (2) transmit and receiving antennas, respectively.

DISCLOSURE OF THE INVENTION

Accordingly, the present invention is directed to a method of encoding space-time codes in a wireless communication system having multiple antennas that substantially obviates one or more problems due to limitations and disadvantages of the related art.

An object of the present invention is to provide a method of transmitting space-time coded data in a wireless communication system having a plurality of antennas.

Another object of the present invention is to provide an apparatus for a transmitting space-time coded data in a wireless communication system having a plurality of antennas.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting space-time coded data in a wireless communication system having a plurality of antennas includes allocating data symbols combined with complex weights to at least two transmit antennas during at least one specified time slot, and transmitting the data symbols combined with complex weights to a receiving end via the at least two transmit antennas during the at least one specified time slot.

In another aspect of the present invention, a method of transmitting space-time coded data in a wireless communication system having a plurality of antennas includes allocating data symbols to at least two transmit antennas during at least one specified time slot, and transmitting the data symbols to a receiving end via the at least two transmit antennas during the at least one specified time slot, wherein the data symbols are combined with complex weights.

In a further aspect of the present invention, an apparatus for transmitting space-time coded data in a wireless communication system having a plurality of antennas includes a multiple antenna encoder for combining complex weights with data symbols and allocating the data symbols combined with complex weights to at least two transmit antennas during at least one specified time slot, and a plurality of antennas for transmitting the data symbols combined with complex weights to a receiving end via the at least two transmit antennas during the at least one specified time slot.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
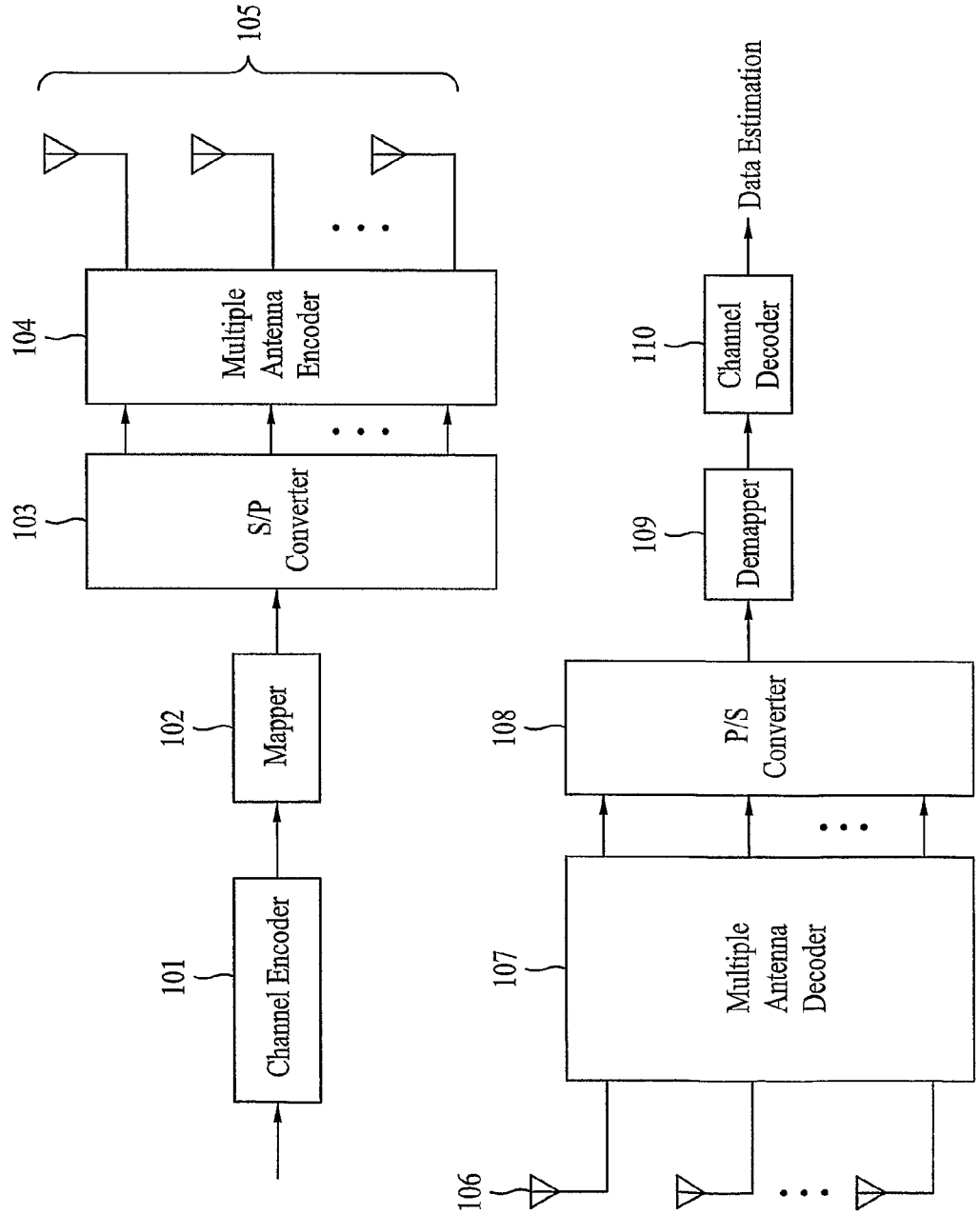
FIG. 1 illustrates a structural diagram of a communication device for transmission/reception.

Reference will now be made in detail to the preferred embodiments of the present invention, examples of which are illustrated in the accompanying drawings. Wherever possible, the same reference numbers will be used throughout the drawings to refer to the same or like parts.

First Embodiment

In a first embodiment of the present invention, the wireless communication system has two (2) transmit antennas. Encoding with space-time code with respect to the first embodiment can transmit data symbols in specified number of time slot units. In other words, space-time coding is applied in a specified number of time slots or time slot units. The number of data symbols transmitted during the specified time slots is determined by the number of transmit antennas available in the system and/or by spatial multiplexing rate according to the space-time coding.

More specifically, during the specified number of time slots, $N_t$ (representing the number of transmit antennas)×R (spatial multiplexing rate) number of data symbols (or a conjugate complex number of the data symbol) and linearly combining weights or weight values for data symbol transmission.

The weights or weight values can be linearly combined with the data symbols. These weights or weight values can also be referred to as complex weights. Preferably, the weight values can change (or can be set) according to the transmit antenna(s) to be used for transmitting the data symbols. In addition, it is possible to modify the first embodiment to accommodate four (4) transmit antennas.

At this time, a discussion of space-time coding in a system having two (2) transmit antennas is presented. First, the spatial multiplexing rate can be set to 1. Equation 7 shows a communication system having two (2) transmit antennas and a spatial multiplexing rate of 1. Here, the signals represented on the same row(s) are transmitted by the same antenna while the signals represented on the same column(s) are transmitted during the same time slot. In other words, rows represent antennas and the columns represent time. Referring to Equation 7, the antenna used for transmitting the signal located on the first row can be referred to as Antenna #1, and the antenna used for transmitting the signal located on the second row can be referred to as Antenna #2.

$$C_{New}^{2\times 1} = \begin{bmatrix} w_1 s_1 + w_2 s_2 & -w_1 s_1 + w_2 s_2 \\ w_3 s_1^* - w_4 s_2^* & w_3 s_1^* + w_4 s_2^* \end{bmatrix} \quad \text{[Equation 7]}$$

In the present application, an example of the space-time coding will be indicated as $C_{New}^{a\times b}$. Here, a denotes the number of transmit antennas, and b denotes the spatial time rate according to the space-time coding.

In Equation 7, the data symbols are transmitted during two (2) time slots or time slot units. That is, space-time coding is performed during two (2) time slots. If performing space-time coding of the first embodiment, that is, space-time coding is performed in a specified number of time slots, the data symbols to be transmitted during the specified number of time slots can be transmitted during each time slot, and weight values can be applied to the data symbols to be transmitted during the specified number of time slots.

Referring to Equation 7, two (2) data symbols are transmitted during two (2) time slots. The data symbols $s_1$ and $s_2$ can be transmitted during the two (2) time slots. That is, $s_1$ and $s_2$ can all be transmitted during each time slot. Moreover, specified weights or weight values ($w_1$, $w_2$, $w_3$, $w_4$) can be applied to each data symbol $s_1$ and $s_2$. The details of the weights/weight values will be described below.

More specifically, the first transmit antenna (i.e., Antenna #1) can transmit data symbols $s_1$ and $s_2$ during the first time slot, and to each data symbol, the weight values are applied. Moreover, the first transmit antenna (i.e., Antenna #1) can transmit data symbols $s_1$ and $s_2$ during the second time slot, and to each data symbol, weights are applied. Further, the second transmit antenna (i.e., Antenna #2) can transmit data symbols $s_1$ and $s_2$, to each data symbol is applied weight values, during the first time slot, and can transmit data symbols $s_1$ and $s_2$, to each data symbol is applied weight values, during the second time slot. The weight values can vary from one time slot to another time slot as well as from one transmit antenna to another transmit antenna. Further, a total power of the transmit antennas during a same time slot is the same.

In the space-time coding scheme according to the first embodiment, an entire set of data symbols to be transmitted during a specified time slot can be transmitted during a single time slot. Further, weights or weight values are applied to all of the data symbols transmitted during the single time slot. Preferably, a result of linearly combined specified weight vector and the data symbol is transmitted during the single time slot.

The weights or weight values can be expressed as shown in Equation 8.

$$w_1 = \frac{e^{j\theta_a}}{\sqrt{2(1+r^2)}}, \quad \text{[Equation 8]}$$
$$w_2 = \frac{re^{j\theta_b}}{\sqrt{2(1+r^2)}},$$
$$w_3 = \frac{re^{j\theta_c}}{\sqrt{2(1+r^2)}},$$
$$w_4 = \frac{e^{j\theta_d}}{\sqrt{2(1+r^2)}}$$

Equation 8 is an equation used to describe the weight values used in Equation 7. As such, the weight values can be constructed in different form and not limited to Equation 8. That is, the weight values of Equation 7 can be complex number(s) having different values, and not limited to Equation 8.

The weight values ($w_1$, $w_2$, $w_3$, $w_4$) can be determined using phase values ($\theta_a$, $\theta_b$, $\theta_c$, $\theta_d$) and a real number r. These variable numbers can be of different values. In other words, the variable numbers can have a different optimal value based on the system, and if the transmitting/receiving end lacks the channel information, the variable number can have optimum capability by satisfying Equation 9.

$$\theta_a + \theta_b = \theta_c + \theta_d, \, r=1 \quad \text{[Equation 9]}$$

Preferably, each of the weight values applied in Equation 7 have the same amplitude, and the sum of the phase of any two (2) weight values is same as the sum of the phase of the remaining two (2) weight values. If Equation 9 is satisfied, then a minimum product distance (indicated as 'dp.min' in Table 1) with respect to Equation 7 can be optimized.

Equation 10 is an example of space-time coding according to the first embodiment which satisfies the conditions of Equation 9.

$$C_{New}^{2\times 1} = \frac{1}{\sqrt{4}} \begin{bmatrix} s_1 + s_2 & -s_1 + s_2 \\ s_1^* - s_2^* & s_1^* + s_2^* \end{bmatrix} \quad \text{[Equation 10]}$$

Figure 2:
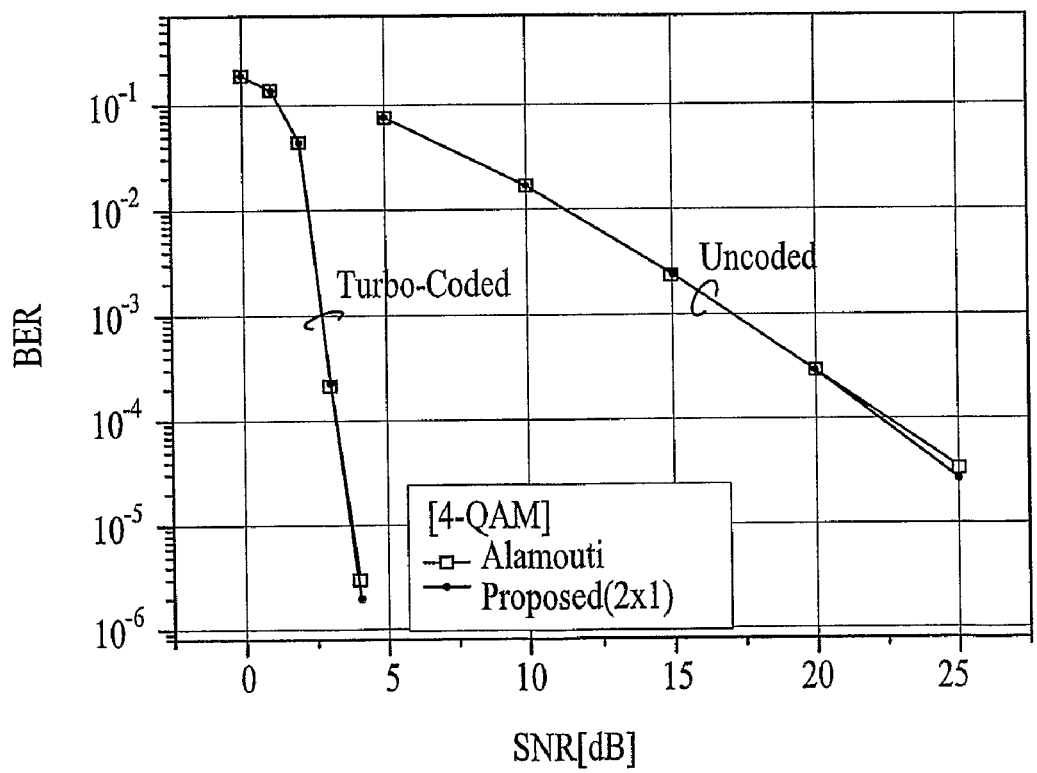
FIG. 2 illustrates an example of an effect of a system having two (2) transmit antennas and one (1) receiving antenna using space-time coding.

FIG. 2 illustrates an example of an effect of a system having two (2) transmit antennas and one (1) receiving antenna using space-time coding. In FIG. 2, the space-time coding (STC) scheme of Equation 7 and Alamouti coding scheme (space-time coding scheme (1) of Table 1) are compared. If the data symbols are uncoded (e.g., channel encoding is not applied or turbo-coded, the STC scheme of Equation 7 shows the same optimal result as that of the Alamouti scheme. The Alamouti coding, as described above with respect to Table 1, provides only one coding method. However, the STC scheme of Equation 7 can use different values for each parameter of Equation 8. That is, each parameter of Equation 8 can have different values to provide various types of space-time coding according to the features/capabilities of different communication systems. As such, the STC scheme of can have better performance than the Alamouti coding scheme in certain communication environments.

In the embodiment of the present invention, the multiple data symbols are transmitted using two or more transmit antennas. Further, each data symbol can be modulated and encoded according to a modulation and coding set (MCS) level, for example. The MCS level can be fed back from the receiving end or alternatively, can be determined at the transmitting end.

As discussed, a full diversity gain can be attained using the space-time coding of Equation 7. More specifically, if the diversity order is 4, each data symbol space-time coded according to Equation 7 can achieve maximum diversity gain. In other words, the STC of Equation 7 provides equal or similar amount of diversity to each data symbol. Preferably, the data symbols are allocated the same MCS level. Preferably, each data symbol transmitted according to the STC of Equation 7 are applied the same modulation method (e.g., all data symbols mapped using 16 QAM) and the same coding method (e.g., channel coding using the same coding rate).

At this time, another example in a communication system having two (2) transmit antennas according to the first embodiment of the present invention will be explained. Here, the first embodiment is applied to the two (2) antenna system with the spatial multiplexing rate of 2. In Equation 11 below, the antenna used to transmit the signal located in the first row is referred to as Antenna #1. Similarly, the antenna used to transmit the signal in the second row is referred to as Antenna #2.

$$C_{New}^{2 \times 2} = \frac{1}{\sqrt{4}} \begin{bmatrix} w_1 s_1 + w_2 s_2 + w_3 s_3 + w_4 s_4 & -w_1 s_1 - w_2 s_2 + w_3 s_3 + w_4 s_4 \\ w_5 s_1 + w_6 s_2 - w_7 s_3 - w_8 s_4 & w_5 s_1 + w_6 s_2 + w_7 s_3 + w_8 s_4 \end{bmatrix} \quad \text{[Equation 11]}$$

Referring to Equation 11, the data symbols are transmitted in two (2) time slots. In other words, the data symbols are space-time coded during the two (2) time slots. If the data symbols are space-time coded during a specified number of time slots according to the first embodiment, all of the data symbols to be transmitted during the specified number of time slots can be transmitted during each time slot, and weight values can be applied to these data symbols.

In Equation 11, four (4) data symbols are transmitted during two (2) time slots. More specifically, the data symbols, $s_1$, $s_2$, $s_3$, $s_4$, are transmitted during two (2) time slots, and during each time slot, all of the data symbols, $s_1$, $s_2$, $s_3$, $s_4$, are transmitted. Further, weight values, $w_1$, $w_2$, $w_3$, $w_4$, $w_5$, $w_6$, $w_7$, $w_8$, are applied to the data symbols, $s_1$, $s_2$, $s_3$, $s_4$.

During the first time slot, the data symbols, $s_1$, $s_2$, $s_3$, $s_4$, are transmitted with weight values applied thereto from Antenna #1. Similarly, the data symbols, $s_1$, $s_2$, $s_3$, $s_4$, with weight values applied thereto are transmitted via Antenna #2 during the first time slot. During the second time slot, the data symbols, $s_1$, $s_2$, $s_3$, $s_4$, are transmitted with weight values applied thereto from each of Antenna #1 and Antenna #2. The weight values can change or vary based on the time slot and/or each transmit antenna.

As discussed, the STC scheme according to the first embodiment transmits all of the data symbols, which are scheduled to be transmitted during a specified number of time slots, during each time slot. Moreover, weight values are applied to all of the data symbols transmitted during each time slot. Preferably, the result of linearly combined specified weight vector and the data symbol is transmitted during the single time slot.

Equation 12 shows the weight values related to Equation 11.

$$w_1 = \frac{e^{j\theta_a}}{\sqrt{4(1+r^2)}}, \quad w_2 = \frac{re^{j\theta_b}}{\sqrt{4(1+r^2)}}, \quad \text{[Equation 12]}$$

$$w_3 = \frac{e^{j\theta_c}}{\sqrt{4(1+r^2)}}, \quad w_4 = \frac{re^{j\theta_d}}{\sqrt{4(1+r^2)}}$$

$$w_5 = \frac{re^{j\theta_e}}{\sqrt{4(1+r^2)}}, \quad w_6 = \frac{e^{j\theta_f}}{\sqrt{4(1+r^2)}},$$

$$w_7 = \frac{re^{j\theta_g}}{\sqrt{4(1+r^2)}}, \quad w_8 = \frac{e^{j\theta_h}}{\sqrt{4(1+r^2)}}$$

Here, Equation 12 is an equation used to describe the weight values used in Equation 11. As such, the weight values can be constructed in different form and not limited to Equation 12. That is, the weight values of Equation 11 can be complex number(s) having different values, and not limited to Equation 12.

Referring to the weight values of Equation 12, $w_1$, $w_2$, $w_3$, $w_4$, $w_7$, $w_8$ are pure real numbers, $w_5$, $w_6$ are pure imaginary numbers, and r times the specified amplitude exists between $w_1$, $w_3$, $w_6$, $w_8$, and $w_2$, $w_4$, $w_5$, $w_7$. Here, r can be $$\frac{\sqrt{5}+1}{2} \text{ or } \frac{\sqrt{5}-1}{2}.$$

As discussed above with respect to the MCS level, a full diversity gain can be attained using the space-time coding of Equation 11. More specifically, if the diversity order is 4, each data symbol space-time coded according to Equation 11 can achieve maximum diversity gain. In other words, the STC of Equation 11 provides equal or similar amount of diversity to each data symbol. Preferably, the data symbols are allocated the same MCS level. Preferably, each data symbol transmitted according to the STC of Equation 11 are applied the same modulation method (e.g., all data symbols mapped using 16 QAM) and the same coding method (e.g., channel coding using the same coding rate).

Figure 3:
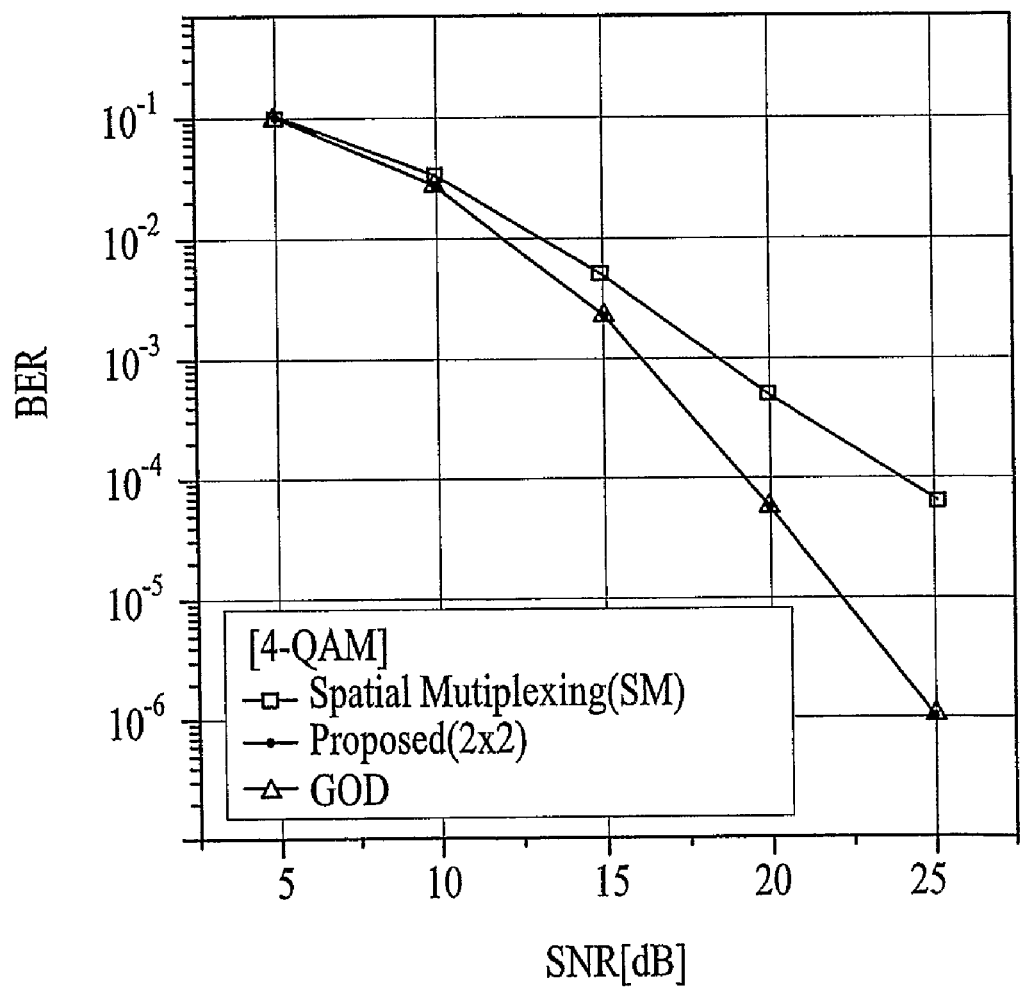
FIG. 3 illustrates a performance comparison of a communication system, having two (2) transmit antennas and one (1) receiving antenna, using STC schemes.
Figure 4:
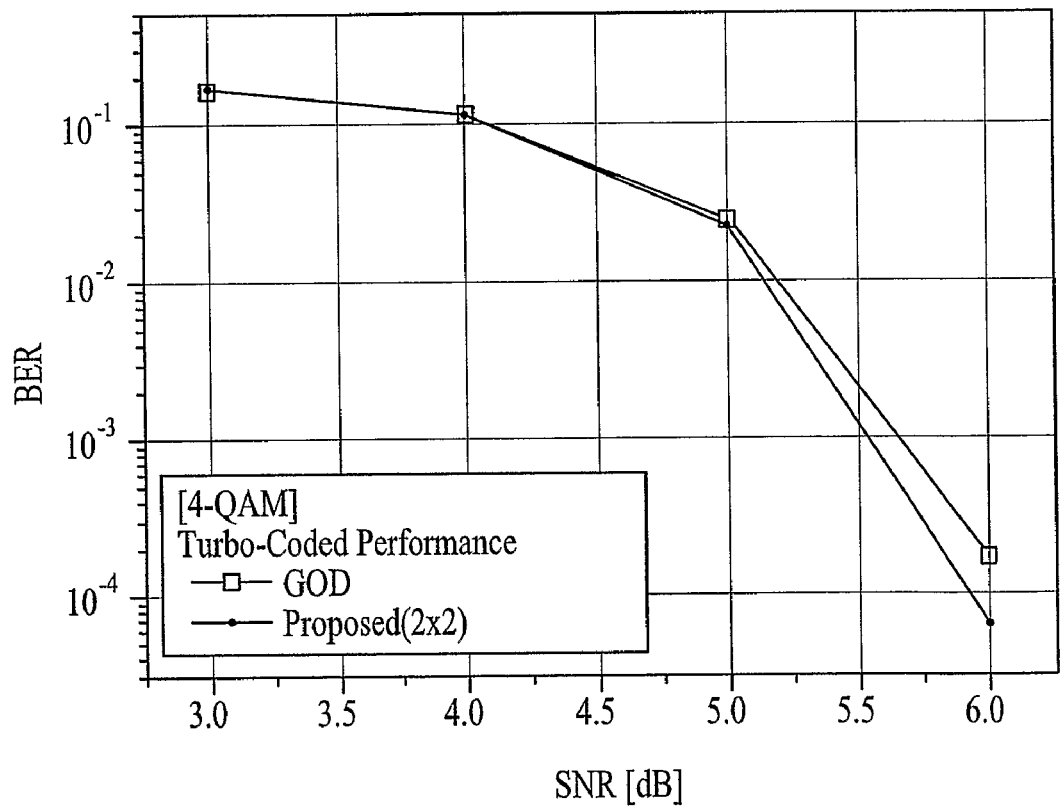
FIG. 4 illustrates another performance comparison of a communication system, having two (2) transmit antennas and one (1) receiving antenna, using STC schemes.

FIG. 3 and FIG. 4 illustrate a performance comparison of a communication system, having two (2) transmit antennas and one (1) receiving antenna, using STC schemes. The graph of FIG. 3 shows the performance of the 4-QAM constellation mapping scheme without STC. The graph of FIG. 4 shows the performance of the 4-QAM constellation mapping scheme with turbo-coding.

More specifically, FIG. 3 is a result of comparing the spatial multiplexing (SM) scheme (2) of Table 1, a generalized optimal diversity (GOD) scheme (3) of Table 1, and space-time coding (STC) scheme of Equation 11. The STC scheme of Equation 11 uses two (2) transmit antennas with the SM rate of 2. Here, the STC scheme (2) of Table 1 and the GOD scheme (3) of Table 1 are used to show the performance of Equation 11. As illustrated, if the STC is not used, the STC of Equation 11 shows better performance than the SM coding while showing similar to equal performance to the GOD coding.

FIG. 4 illustrates a comparison of the GOD scheme between scheme (3) of Table 1 and STD scheme of Equation 11. As shown in FIG. 3, the two schemes showed same performance result even when no channel coding was used. However, when turbo coding was used for channel coding, the STC scheme of Equation 11 showed better performance. Further, turbo code for space-time coding according to Equation 11 showed better performance than the GOD coding scheme as well.

In summary, the STC according to the first embodiment showed equal performance in certain situations. However, the STC according to the first embodiment is able to manipulate the weight values applied to the data symbols. As discussed by referring to FIGS. 2-4, different characteristics can be expressed based on the channel condition even if the STC is the same. The STC according to the embodiment of the present invention can have better performance than the conventional STC in certain situations.

Second Embodiment

In a second embodiment of the present invention, the space-time coding can be applied in a communication system having four (4) transmit antennas. Here, the STC scheme can be represented by the data symbols being transmitted during a specified number of time slots. Further, weight values are applied to each data symbol (or to the conjugate complex number of the data symbol) before being transmitted to the receiving end. The weight values applied to the data symbols are preferably changed or modified based on the antenna which is used to transmit the data symbols. Moreover, the weight values are preferably changed or modified based on the time slots which are used to transmit the weight-applied data symbol.

The discussion of the second embodiment is based on the wireless communication system having four (4) antennas which is an expanded modification from the first embodiment.

$$C_{New1}^{4\times 1} = \begin{bmatrix} w_1 s_1 + w_2 s_2 & -w_1 s_1 + w_2 s_2 & 0 & 0 \\ w_3 s_1^* - w_4 s_2^* & w_3 s_1^* + w_4 s_2^* & 0 & 0 \\ 0 & 0 & w_1 s_3 + w_2 s_4 & -w_1 s_3 + w_2 s_4 \\ 0 & 0 & w_3 s_3^* - w_4 s_4^* & w_3 s_3^* + w_4 s_4^* \end{bmatrix}$$ [Equation 14]

Equation 14 shows the STC scheme of a communication system having four (4) antennas and the spatial multiplexing rate of 1. Here, the signals located on the same row(s) are transmitted by the same antenna while the signals located on the same column(s) are transmitted during the same time slot. In other words, rows represent antennas and the columns represent time. Referring to Equation 14, the antenna used for transmitting the signal located on the first row can be referred to as Antenna #1, the antenna used for transmitting the signal located on the second row can be referred to as Antenna #2, the antenna used for transmitting the signal located on the third row can be referred to as Antenna #3, and the antenna used for transmitting the signal located on the fourth row can be referred to as Antenna #4.

Referring to Equation 14, the data symbols are transmitted during four (4) time slots. In the space-time coding according to the second embodiment, if the space-time coding is performed using a specified number of time slots, each transmit antenna transmits a specific data symbol, all of the data symbols to be transmitted via the specified antennas are transmitted during the specified number of time slots, and weight values are applied to the data symbols transmitted during the specified number of time slots.

Referring to Equation 14, four (4) transmit antennas transmit four (4) data symbols, $s_1$, $s_2$, $s_3$, $s_4$, during four (4) time slots. Further, each transmit antenna transmits two (2) data symbols during four (4) time slots. The data symbols, $s_1$ and $s_2$, are transmitted via Antenna #1 and Antenna #2, respectively, during the first two (2) time slots of the four (4) time slots. Moreover, the weight values, $w_1$, $w_2$, $w_3$, $w_4$, are applied to each data symbol, $s_1$ and $s_2$. Furthermore, the data symbols, $s_3$ and $s_4$, are transmitted via Antenna #3 and Antenna 4, respectively, during the third and four time slots. Similarly, the weight values, $w_1$, $w_2$, $w_3$, $w_4$, are applied to each data symbol, $s_3$ and $s_4$. As discussed above, the weight values applied to data symbols can vary/change from one time slot to another, and also from one antenna to another.

The weights or weight values as shown in Equation 14 can be expressed according to Equation 15.

$$w_1 = \frac{e^{j\theta_a}}{\sqrt{2(1+r^2)}}, \quad w_2 = \frac{re^{j\theta_b}}{\sqrt{2(1+r^2)}},$$
$$w_3 = \frac{re^{j\theta_c}}{\sqrt{2(1+r^2)}}, \quad w_4 = \frac{e^{j\theta_d}}{\sqrt{2(1+r^2)}},$$ [Equation 15]

Equation 15 is an equation used to describe the weight values used in Equation 14. As such, the weight values can be constructed in different form and not limited to Equation 14. That is, the weight values of Equation 15 can be complex number(s) having different values, and not limited to Equation 15.

The weight values ($w_1$, $w_2$, $w_3$, $w_4$) can be determined using phase values ($\theta_a$, $\theta_b$, $\theta_c$, $\theta_d$) and a real number r. These variable numbers can be of different values. In other words, the variable numbers can have a different optimal value based on the system, and if the transmitting/receiving end lacks the channel information, the variable number can have optimum capability by satisfying Equation 16.

$$\theta_a + \theta_b = \theta_c + \theta_d, \quad r=1$$ [Equation 16]

Preferably, each of the weight values applied in Equation 14 have the same amplitude, and the sum of the phase of any two (2) weight values is same as the sum of the phase of the remaining two (2) weight values. If Equation 16 is satisfied, then a minimum product distance (indicated as 'dp.min' in Table 1) with respect to Equation 7 can be optimized.

The STC scheme of Equation 14 corresponds to the STC scheme indicated by (5) of Table 1. Here, the STC scheme of Equation 14 shows similar to equal effectiveness to that of scheme (5) of Table 1. Further, the STC scheme of Equation 14 can be used to manipulate the weight values to provide various STC combinations for further effectiveness.

Looking at the signal transmitted via Antenna #1, for example, the data symbols, $s_1$ and $s_2$, are transmitted after being combined. Similarly, the data symbols, $s_1$ and $s_2$, transmitted via Antenna #2 are also combined before transmission. Further, the data symbols, $s_3$ and $s_4$, are combined and transmitted via Antenna #3 and Antenna #4, respectively.

The data symbols, $s_1$ and $s_2$, are transmitted via the same channel (i.e., first channel) while the data symbols, $s_3$ and $s_4$, are transmitted via the same channel (i.e., second channel). Here, the same MCS level can be applied to the data symbols transmitted during the same specified time slot. That is, a first MCS level is assigned to the data symbols, $s_1$ and $s_2$, and a second MCS level is assigned to the data symbols, $s_3$ and $s_4$. The first MCS level and the second MCS level can be same or different.

If the space-time coding, which does not provide full diversity, is used, it is preferable to assign the same level MCS level to the weight-combined data symbols which are transmitted during a specific time slot.

The following is another example of space-time coding in a four (4) antenna system in which the space multiplexing rate is 1.

$$C_{New2}^{4\times 1} = \begin{bmatrix} w_1\tilde{x}_1 + w_2\tilde{x}_2 & -w_1\tilde{x}_1 + w_2\tilde{x}_2 & 0 & 0 \\ w_3\tilde{x}_1^* - w_4\tilde{x}_2^* & w_3\tilde{x}_1^* + w_4\tilde{x}_2^* & 0 & 0 \\ 0 & 0 & w_1\tilde{x}_3 + w_2\tilde{x}_4 & -w_1\tilde{x}_3 + w_2\tilde{x}_4 \\ 0 & 0 & w_3\tilde{x}_3^* - w_4\tilde{x}_4^* & w_3\tilde{x}_3^* + w_4\tilde{x}_4^* \end{bmatrix}$$ [Equation 17]

In Equation 17, the data symbols are transmitted during four (4) time slots. That is, the space-time coding is performed during four (4) time slots. Referring to Equation 17, $x_i = s_i e^{j\theta_r}$, where i=1, 2, 3, 4, and $\tilde{x}_1 = x_1^R + jx_3^I$, $\tilde{x}_2 = x_2^R + jx_4^I$, $\tilde{x}_3 = x_3^R + jx_1^I$, and $\tilde{x}_4 = x_4^R + jx_2^I$. Here, the superscript R represents a real number of a complex number, and I represents an imaginary number of a complex number.

Further, all four (4) antennas transmit signals $\tilde{x}_1, \tilde{x}_2, \tilde{x}_3, \tilde{x}_4$ which correspond to data symbols $s_1, s_2, s_3, s_4$ during four (4) time slots. In addition, since the signals $\tilde{x}_1, \tilde{x}_2, \tilde{x}_3, \tilde{x}_4$ are derived from each of the data symbols, $s_1, s_2, s_3, s_4$, each transmit antenna transmits signals which correspond to data symbols $s_1, s_2, s_3, s_4$ during the four (4) time slots. More specifically, $\tilde{x}_1$ and $\tilde{x}_2$ corresponding to the data symbols $s_1, s_2, s_3, s_4$ are transmitted via Antenna #1 and Antenna #2, respectively, the signals are transmitted during the first two time slots out of four (4) time slots, and specific weight values $w_1, w_2, w_3, w_4$ are applied. Furthermore, $\tilde{x}_3$ and $\tilde{x}_4$ corresponding to the data symbols $s_1, s_2, s_3, s_4$ are transmitted via Antenna #3 and Antenna #4, respectively, the signals are transmitted during the last two time slots out of four (4) time slots, and specific weight values $w_1, w_2, w_3, w_4$ are applied.

In other words, Antenna #1 and Antenna #2 can be used to transmit $\tilde{x}_1$ and $\tilde{x}_2$ corresponding to the data symbols $s_1, s_2, s_3, s_4$, respectively, and Antenna #3 and Antenna #4 can be used to transmit $\tilde{x}_3$ and $\tilde{x}_4$ corresponding to the data symbols $s_1, s_2, s_3, s_4$, respectively. The weight values applied to the signals, $\tilde{x}_1, \tilde{x}_2, \tilde{x}_3, \tilde{x}_4$, or the weight values applied to the data symbols, $s_1, s_2, s_3, s_4$, can vary from one time slot to another and can also vary from one transmit antenna to another.

The weights or weight values can be expressed as shown in Equation 18.

$$w_1 = \frac{e^{j\theta_a}}{\sqrt{2(1+r^2)}}, \quad w_2 = \frac{re^{j\theta_b}}{\sqrt{2(1+r^2)}},$$
$$w_3 = \frac{re^{j\theta_c}}{\sqrt{2(1+r^2)}}, \quad w_4 = \frac{e^{j\theta_d}}{\sqrt{2(1+r^2)}},$$ [Equation 18]

Equation 18 is an equation used to describe the weight values used in Equation 17. As such, the weight values can be constructed in different form and not limited to Equation 18. That is, the weight values of Equation 17 can be complex number(s) having different values, and not limited to Equation 18.

The weight values ($w_1, w_2, w_3, w_4$) can be determined using phase values ($\theta_a, \theta_b, \theta_c, \theta_d$) and a real number r. These variable numbers can be of different values. In other words, the variable numbers can have a different optimal value based on the system, and if the transmitting/receiving end lacks the channel information, the variable number can have optimum capability by satisfying Equation 19 and Equation 20.

$$\theta_a + \theta_b = \theta_c + \theta_d, \quad r = 1$$ [Equation 19]

Preferably, each of the weight values applied in Equation 18 have the same amplitude, and the sum of the phase of any two (2) weight values is same as the sum of the phase of the remaining two (2) weight values.

[Equation 20]
$$\theta_r = \frac{1}{2}\tan^{-1} \quad (2)$$

$\theta_r$ can be used to determine $x_i$ and $s_i$.

The STC of Equation 17 can be used to improve the STC of Equation 14. the STC of Equation 17 has a rank of 4, and a minimum product distance of 0.25. The rank corresponds to diversity gain based on space-time coding, and the minimum product distance corresponds to coding gain.

As discussed, full diversity gain can be attained by the STC scheme according to Equation 17. A same MCS level is preferably assigned to the data symbols transmitted according to the STC scheme of Equation 17. In other words, the same MCS level is applied to each data symbol transmitted according to the STC scheme of Equation 17.

The following is another example of space-time coding that can be applied to a four (4) antenna system in which the spatial multiplexing rate is 1.

$$C_{New3}^{4\times 1} = \begin{bmatrix} w_1s_1 + w_2s_2 + w_3s_3 + w_4s_4 & -w_1s_1 - w_2s_2 + w_3s_3 + w_4s_4 & 0 & 0 \\ w_5s_1 + w_6s_2 - w_7s_3 - w_8s_4 & w_5s_1 + w_6s_2 + w_7s_3 + w_8s_4 & 0 & 0 \\ 0 & 0 & w_1s_1 + w_2s_2 + w_3s_3 + w_4w_4 & -w_1s_1 - w_2s_2 + w_3s_3 + w_4s_4 \\ 0 & 0 & w_5s_1 + w_6s_2 - w_7s_3 - w_8s_4 & w_5s_1 + w_6s_2 + w_7s_3 + w_8s_4 \end{bmatrix}$$ [Equation 21]

In Equation 21, the data symbols are transmitted during four (4) time slots. That is, the space-time coding is performed during four (4) time slots.

In Equation 21, four (4) data symbols are transmitted via four (4) antennas during four (4) time slots. In other words, each transmit antenna transmits four (4) data symbols during four (4) time slots. If data symbols, $s_1$, $s_2$, $s_3$, $s_4$, are transmitted via Antenna #1 and Antenna #2, these data symbols are transmitted during the first two (2) out of four (4) time slots, and the weight values, $w_1$, $w_2$, $w_3$, $w_4$, are applied to each data symbol. Further, if data symbols, $s_1$, $s_2$, $s_3$, $s_4$, are transmitted via Antenna #3 and Antenna #4, these data symbols are transmitted during the last two (2) out of four (4) time slots, and the weight values, $w_5$, $w_6$, $w_7$, $w_8$, are applied to each data symbol.

The each antenna according to the second embodiment can be used to transmit specific data symbol. At the same time, all transmit antennas can be used to transmit the data symbols, $s_1$, $s_2$, $s_3$, $s_4$. Further, the weight values applied to the data symbols, $s_1$, $s_2$, $s_3$, $s_4$, can vary from one time slot to another as well as from one antenna to another.

Equation 22 shows the weight values related to Equation 21.

$$w_1 = \frac{e^{j\theta_a}}{\sqrt{4(1+r^2)}}, \quad w_2 = \frac{re^{j\theta_b}}{\sqrt{4(1+r^2)}},$$

$$w_3 = \frac{e^{j\theta_c}}{\sqrt{4(1+r^2)}}, \quad w_4 = \frac{re^{j\theta_d}}{\sqrt{4(1+r^2)}},$$

$$w_5 = \frac{re^{j\theta_e}}{\sqrt{4(1+r^2)}}, \quad w_6 = \frac{e^{j\theta_f}}{\sqrt{4(1+r^2)}},$$

$$w_7 = \frac{re^{j\theta_g}}{\sqrt{4(1+r^2)}}, \quad w_8 = \frac{e^{j\theta_h}}{\sqrt{4(1+r^2)}}$$

[Equation 22]

Here, Equation 22 is an equation used to describe the weight values used in Equation 21. As such, the weight values can be constructed in different form and not limited to Equation 22. That is, the weight values of Equation 21 can be complex number(s) having different values, and not limited to Equation 22.

Referring to the weight values of Equation 22, $w_1$, $w_2$, $w_3$, $w_4$, $w_7$, $w_8$ are determined by phase values, $\theta_a$, $\theta_b$, $\theta_c$, $\theta_d$, $\theta_e$, $\theta_f$, $\theta_g$, $\theta_h$, and a real number, r. As such, these variable numbers can be of different values. In other words, the variable numbers can have a different optimal value based on the system, and if the transmitting/receiving end lacks the channel information, the variable number can have optimum capability by satisfying Equation 23.

$$r = \frac{\sqrt{5} \pm 1}{2}, \quad \theta_a = \theta_b = \theta_c = \theta_d = 0,$$

$$\theta_e = \frac{3\pi}{2}, \quad \theta_f = \frac{\pi}{2}, \quad \theta_g = \pi, \quad \theta_h = 0$$

[Equation 23]

That is, referring to Equation 23, preferably, $w_1$, $w_2$, $w_3$, $w_4$, $w_7$, $w_8$ are real numbers, $w_5$, $w_6$ are imaginary numbers, and r times the specified amplitude exists between $w_1$, $w_3$, $w_6$, $w_8$ and $w_2$, $w_4$, $w_5$, $w_7$. Here, r can be $$\frac{\sqrt{5}+1}{2} \text{ or } \frac{\sqrt{5}-1}{2}.$$

As discussed above with respect to the MCS level, a full diversity gain can be attained using the space-time coding of Equation 21. Preferably, the data symbols, which are transmitted according to the STC of Equation 21, are allocated the same MCS level. Preferably, each data symbol transmitted according to the STC of Equation 21 are applied the same modulation method and the same coding method.

Figure 5:
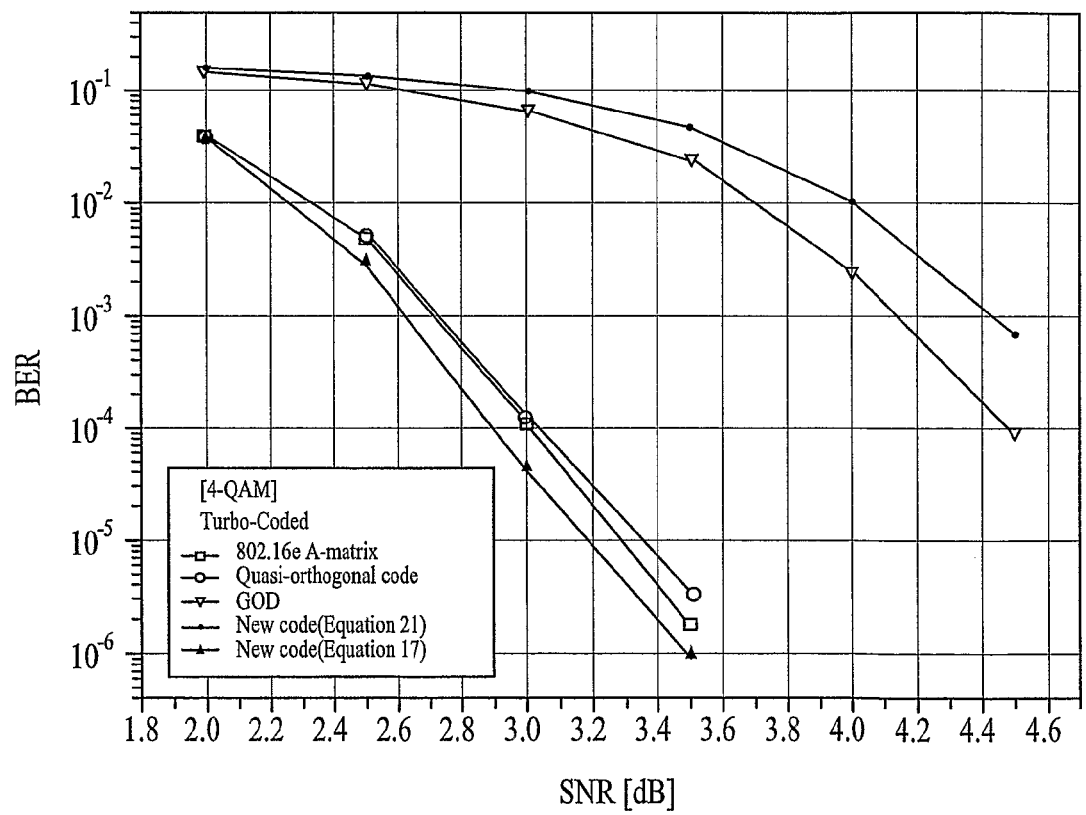
FIG. 5 illustrates a performance comparison between conventional STC schemes and the STC scheme according to the second embodiment.

FIG. 5 illustrates a performance comparison between conventional STC schemes and the STC scheme according to the second embodiment. The result of FIG. 5 is based on using turbo coding for space-time coding, and if 4-QAM is used, a generalized optimal diversity (GOD) scheme (3) of Table 1, a quasi-orthogonal code STC scheme (4) of Table 1, A-matrix, proposed in IEEE 802.16e, STC scheme (5) of Table 1, a result of Equation 17, and a result of Equation 21.

As discussed, the STC performance can changed based on channel environment. Further, as illustrated in FIG. 5, the result of Equation 17 is an improvement from the conventional optimum STC scheme.

The following is an example of space-time coding that can be applied to a four (4) antennas system.

$$C_{New1}^{4\times 2} = \begin{bmatrix} w_1s_1 + w_2s_2 & -w_1s_1 + w_2s_2 \\ w_3s_1^* - w_4s_2^* & w_3s_1^* + w_4s_2^* \\ w_1s_3 + w_2s_4 & -w_1s_3 + w_2s_4 \\ w_3s_3^* - w_4s_4^* & w_3s_3^* + w_4s_4^* \end{bmatrix}$$ [Equation 24]

In Equation 24, the data symbols are transmitted during two (2) time slots. That is, space-time coding is performed during two (2) time slots. Referring to Equation 24, there are a total of four (4) transmit antennas. Here, these four (4) antennas are used to transmit four (4) data symbols, $s_1$, $s_2$, $s_3$, $s_4$, during two (2) time slots. Further, each antenna transmits two (2) data symbols during two (2) time slots. The data symbols, $s_1$ and $s_2$, are transmitted via Antenna #1 and Antenna #2, respectively. Moreover, the weight values, $w_1$, $w_2$, $w_3$, $w_4$, are applied to each data symbol, $s_1$ and $s_2$. Furthermore, the data symbols, $s_3$ and $s_4$, are transmitted via Antenna #3 and Antenna 4, respectively. Similarly, the weight values, $w_1$, $w_2$, $w_3$, $w_4$, are applied to each data symbol, $s_3$ and $s_4$. As discussed above, the weight values applied to data symbols can vary/change from one time slot to another, and also from one antenna to another.

The weights or weight values as shown in Equation 24 can be expressed according to Equation 25.

$$w_1 = \frac{e^{j\theta_a}}{\sqrt{2(1+r^2)}}, \quad w_2 = \frac{re^{j\theta_b}}{\sqrt{2(1+r^2)}},$$
$$w_3 = \frac{re^{j\theta_c}}{\sqrt{2(1+r^2)}}, \quad w_4 = \frac{e^{j\theta_d}}{\sqrt{2(1+r^2)}},$$
[Equation 25]

Equation 25 is an equation used to describe the weight values used in Equation 24. As such, the weight values can be constructed in different form and not limited to Equation 24. That is, the weight values of Equation 25 can be complex number(s) having different values, and not limited to Equation 25.

The weight values ($w_1$, $w_2$, $w_3$, $w_4$) can be determined using phase values ($\theta_a$, $\theta_b$, $\theta_c$, $\theta_d$) and a real number r. These variable numbers can be of different values. In other words, the variable numbers can have a different optimal value based on the system, and if the transmitting/receiving end lacks the channel information, the variable number can have optimum capability by satisfying Equation 26.

$$\theta_a + \theta_b = \theta_c + \theta_d, \quad r=1$$
[Equation 26]

Preferably, each of the weight values applied in Equation 24 have the same amplitude, and the sum of the phase of any two (2) weight values is same as the sum of the phase of the remaining two (2) weight values. If Equation 26 is satisfied, then a minimum product distance (indicated as 'dp.min' in Table 1) with respect to Equation 24 can be optimized.

The STC scheme of Equation 24 does not provide full diversity. Further, it is preferable that a same modulation level and a same coding level is applied to the data symbols, which are linearly combined with specific weight values during a specified time slot. For example, the data symbols, $s_1$ and $s_2$, are assigned a first MCS level while the data symbols, $s_3$ and $s_4$, are assigned a second MCS level.

The following is another example of space-time coding that can be applied to a four (4) antennas system.

$$C_{New2}^{4\times2} = \begin{bmatrix} w_1\tilde{x}_1 + w_2\tilde{x}_2 & -w_1\tilde{x}_1 + w_2\tilde{x}_2 \\ w_3\tilde{x}_1^* - w_4\tilde{x}_2^* & w_3\tilde{x}_1^* + w_4\tilde{x}_2^* \\ w_1\tilde{x}_3 + w_2\tilde{x}_4 & -w_1\tilde{x}_3 + w_2\tilde{x}_4 \\ w_3\tilde{x}_3^* - w_4\tilde{x}_4^* & w_3\tilde{x}_3^* + w_4\tilde{x}_4^* \end{bmatrix}$$
[Equation 27]

In Equation 27, the data symbols are transmitted during two (2) time slots. That is, the space-time coding is performed during two (2) time slots. Referring to Equation 27, $x_i = s_i e^{j\theta_r}$, where i=1, 2, 3, 4, and $\tilde{x}_1 = x_1^R + jx_3^I$, $\tilde{x}_2 = x_2^R + jx_4^I$, $\tilde{x}_3 = x_3^R + jx_1^I$, and $\tilde{x}_4 = x_4^R + jx_2^I$. Here, the superscript R represents a real number of a complex number, and I represents an imaginary number of a complex number.

Further, all four (4) antennas transmit signals $\tilde{x}_1, \tilde{x}_2, \tilde{x}_3, \tilde{x}_4$ which correspond to data symbols $s_1, s_2, s_3, s_4$ during four (4) time slots. In addition, since the signals $\tilde{x}_1, \tilde{x}_2, \tilde{x}_3, \tilde{x}_4$ are derived from each of the data symbols $s_1, s_2, s_3, s_4$, each transmit antenna transmits signals which correspond to data symbols $s_1, s_2, s_3, s_4$ during the four (4) time slots. More specifically, $\tilde{x}_1$ and $\tilde{x}_2$ corresponding to the data symbols $s_1, s_2, s_3, s_4$ are transmitted via Antenna #1 and Antenna #2, respectively, the signals are transmitted during the first two time slots out of four (4) time slots, and specific weight values $w_1, w_2, w_3, w_4$ are applied. Furthermore, $\tilde{x}_3$ and $\tilde{x}_4$ corresponding to the data symbols $s_1, s_2, s_3, s_4$ are transmitted via Antenna #3 and Antenna #4, respectively, the signals are transmitted during the last two time slots out of four (4) time slots, and specific weight values $w_1, w_2, w_3, w_4$ are applied.

In other words, Antenna #1 and Antenna #2 can be used to transmit $\tilde{x}_1$ and $\tilde{x}_2$ corresponding to the data symbols $s_1, s_2, s_3, s_4$, respectively, and Antenna #3 and Antenna #4 can be used to transmit $\tilde{x}_1$ and $\tilde{x}_2$ corresponding to the data symbols $s_1, s_2, s_3, s_4$, respectively. The weight values applied to the signals, $\tilde{x}_1, \tilde{x}_2, \tilde{x}_3, \tilde{x}_4$, or the weight values applied to the data symbols, $s_1, s_2, s_3, s_4$, can vary from one time slot to another and can also vary from one transmit antenna to another.

The weights or weight values can be expressed as shown in Equation 28.

$$w_1 = \frac{e^{j\theta_a}}{\sqrt{2(1+r^2)}}, \quad w_2 = \frac{re^{j\theta_b}}{\sqrt{2(1+r^2)}},$$
$$w_3 = \frac{re^{j\theta_c}}{\sqrt{2(1+r^2)}}, \quad w_4 = \frac{e^{j\theta_d}}{\sqrt{2(1+r^2)}}$$
[Equation 28]

Equation 28 is an equation used to describe the weight values used in Equation 27. As such, the weight values can be constructed in different form and not limited to Equation 28. That is, the weight values of Equation 27 can be complex number(s) having different values, and not limited to Equation 28.

The weight values ($w_1$, $w_2$, $w_3$, $w_4$) can be determined using phase values, $\theta_a$, $\theta_b$, $\theta_c$, $\theta_d$, and a real number r. These variable numbers can be of different values. In other words, the variable numbers can have a different optimal value based on the system, and if the transmitting/receiving end lacks the channel information, the variable number can have optimum capability by satisfying Equation 29 and Equation 30.

$$\theta_a + \theta_b = \theta_c + \theta_d, \quad r=1$$
[Equation 29]

Preferably, each of the weight values applied in Equation 28 have the same amplitude, and the sum of the phase of any two (2) weight values is same as the sum of the phase of the remaining two (2) weight values.

$$\theta_r = \frac{1}{2}\tan^{-1}(2)$$
[Equation 30]

$\theta_r$ can be used to determine $x_i$ and $s_i$.

The STC of Equation 27 does not provide full diversity. However, $\tilde{x}_1$ and $\tilde{x}_2$ corresponding to the data symbols $s_1, s_2, s_3, s_4$ are transmitted via Antenna #1 and Antenna #2, respectively, the signals are transmitted. Furthermore, $\tilde{x}_3$ and $\tilde{x}_4$ corresponding to the data symbols $s_1, s_2, s_3, s_4$ are transmitted via Antenna #3 and Antenna #4, respectively. Further, all of the data symbols, $s_1, s_2, s_3, s_4$, are combined during a specified time slot and then transmitted. Preferably, a same MCS level is assigned to all of the data symbols.

The following is another example of space-time coding that can be used in a four (4) antenna system in which the spatial multiplexing rate is 2. The following is based on Equation 11.

$$C_{New3}^{4\times 2} = \begin{bmatrix} w_1\tilde{x}_1 + w_2\tilde{x}_2 + w_3\tilde{x}_3 + w_4\tilde{x}_4 & -w_1\tilde{x}_1 - w_2\tilde{x}_2 + w_3\tilde{x}_3 + w_4\tilde{x}_4 & 0 & 0 \\ w_5\tilde{x}_1 + w_6\tilde{x}_2 - w_7\tilde{x}_3 - w_8\tilde{x}_4 & w_5\tilde{x}_1 + w_6\tilde{x}_2 + w_7\tilde{x}_3 + w_8\tilde{x}_4 & 0 & 0 \\ 0 & 0 & w_1\tilde{x}_5 + w_2\tilde{x}_6 + w_3\tilde{x}_7 + w_4\tilde{x}_8 & -w_1\tilde{x}_5 - w_2\tilde{x}_6 + w_3\tilde{x}_7 + w_4\tilde{x}_8 \\ 0 & 0 & w_5\tilde{x}_5 + w_6\tilde{x}_6 - w_7\tilde{x}_7 - w_8\tilde{x}_8 & w_5\tilde{x}_5 + w_6\tilde{x}_6 + w_7\tilde{x}_7 + w_8\tilde{x}_8 \end{bmatrix}$$

[Equation 31]

Referring to Equation 31, $x_i = s_i e^{j\Theta_r}$, where $i=1, 2, \ldots, 8$, and $\tilde{x}_1 = x_1^R + jx_5^I$, $\tilde{x}_2 = x_2^R + jx_6^I$, $\tilde{x}_3 = x_3^R + jx_7^I$, $\tilde{x}_4 = x_4^R + jx_8^I$, $\tilde{x}_5 = x_5^R + jx_1^I$, $\tilde{x}_6 = x_6^R + jx_2^I$, $\tilde{x}_7 = x_7^R + jx_3^I$, and $\tilde{x}_8 = x_8^R + jx_4^I$. Here, the superscript R represents a real number of a complex number, and I represents an imaginary number of a complex number.

In Equation 31, a total of four (4) antennas transmit signals $\tilde{x}_1, \tilde{x}_2, \tilde{x}_3, \tilde{x}_4, \tilde{x}_5, \tilde{x}_6, \tilde{x}_7, \tilde{x}_8$ which correspond to data symbols $s_1, s_2, s_3, s_4, s_5, s_6, s_7, s_8$ during four (4) time slots. Furthermore, since the signals $\tilde{x}_1, \tilde{x}_2, \tilde{x}_3, \tilde{x}_4, \tilde{x}_5, \tilde{x}_6, \tilde{x}_7, \tilde{x}_8$ are derived from each of the data symbols, $s_1, s_2, s_3, s_4, s_5, s_6, s_7, s_8$, each transmit antenna transmits signals which correspond to data symbols $s_1, s_2, s_3, s_4, s_5, s_6, s_7, s_8$ during the four (4) time slots.

More specifically, $\tilde{x}_1, \tilde{x}_2, \tilde{x}_3, \tilde{x}_4$ corresponding to the data symbols $s_1, s_2, s_3, s_4, s_5, s_6, s_7, s_8$ are transmitted via Antenna #1 and Antenna #2, respectively, the signals are transmitted during the first two time slots out of four (4) time slots, and specific weight values $w_1, w_2, w_3, w_4, w_5, w_6, w_7, w_8$ are applied. Additionally, $\tilde{x}_5, \tilde{x}_6, \tilde{x}_7, \tilde{x}_8$ corresponding to the data symbols $s_1, s_2, s_3, s_4, s_5, s_6, s_7, s_8$ are transmitted via Antenna #3 and Antenna #4, respectively, the signals are transmitted during the last two time slots out of four (4) time slots, and specific weight values $w_1, w_2, w_3, w_4, w_5, w_6, w_7, w_8$ are applied.

In other words, Antenna #1 and Antenna #2 can be used to transmit $\tilde{x}_1, \tilde{x}_2, \tilde{x}_3, \tilde{x}_4$ corresponding to the data symbols $s_1, s_2, s_3, s_4, s_5, s_6, s_7, s_8$, respectively, and Antenna #3 and Antenna #4 can be used to transmit $\tilde{x}_5, \tilde{x}_6, \tilde{x}_7, \tilde{x}_8$ corresponding to the data symbols $s_1, s_2, s_3, s_4, s_5, s_6, s_7, s_8$, respectively. The weight values applied to the signals, $\tilde{x}_1, \tilde{x}_2, \tilde{x}_3, \tilde{x}_4$, or the weight values applied to the data symbols, $s_1, s_2, s_3, s_4$, can vary from one time slot to another and can also vary from one transmit antenna to another.

Equation 32 shows the weight values related to Equation 21.

$$w_1 = \frac{e^{j\theta_a}}{\sqrt{4(1+r^2)}}, w_2 = \frac{re^{j\theta_b}}{\sqrt{4(1+r^2)}},$$
$$w_3 = \frac{e^{j\theta_c}}{\sqrt{4(1+r^2)}}, w_4 = \frac{re^{j\theta_d}}{\sqrt{4(1+r^2)}},$$
$$w_5 = \frac{re^{j\theta_e}}{\sqrt{4(1+r^2)}}, w_6 = \frac{e^{j\theta_f}}{\sqrt{4(1+r^2)}},$$
$$w_7 = \frac{re^{j\theta_g}}{\sqrt{4(1+r^2)}}, w_8 = \frac{e^{j\theta_h}}{\sqrt{4(1+r^2)}}$$

[Equation 32]

Here, Equation 32 is an equation used to describe the weight values used in Equation 31. As such, the weight values can be constructed in different form and not limited to Equation 32. That is, the weight values of Equation 31 can be complex number(s) having different values, and not limited to Equation 32.

Referring to the weight values of Equation 32, $w_1, w_2, w_3, w_4, w_7, w_8$ are determined by phase values, $\theta_a, \theta_b, \theta_c, \theta_d, \theta_e, \theta_f, \theta_g, \theta_h$, and a real number, r. As such, these variable numbers can be of different values. In other words, the variable numbers can have a different optimal value based on the system, and if the transmitting/receiving end lacks the channel information, the variable number can have optimum capability by satisfying Equation 33.

$$r = \frac{\sqrt{5} \pm 1}{2}, \theta_a = \theta_b = \theta_c = \theta_d = 0, \theta_e = \frac{3\pi}{2},$$
$$\theta_f = \frac{\pi}{2}, \theta_g = \pi, \theta_h = 0$$

[Equation 33]

That is, referring to Equation 33, preferably, $w_1, w_2, w_3, w_4, w_7, w_8$ are real numbers, $w_5, w_6$ are imaginary numbers, and r times the specified amplitude exists between $w_1, w_3, w_6, w_8$ and $w_2, w_4, w_5, w_7$. Here, r can be $$\frac{\sqrt{5}+1}{2} \text{ or } \frac{\sqrt{5}-1}{2}.$$

$$\theta_r = \frac{\pi}{36}$$

[Equation 34]

$\theta_r$ can be used to determine $x_i$ and $s_i$, preferably.

If the STC schemes discussed with respect to Equations 24, 27, and 31 are used, a same performance result can be obtained to that of the STC scheme (6) of Table 1. Space-time coding can be of different types based on the weight values, and an improved result can be obtained compared to the conventional coding depending on the channel condition.

The STC of Equation 27 does not provide full diversity. However, $\tilde{x}_1, \tilde{x}_2, \tilde{x}_3, \tilde{x}_4$ corresponding to the data symbols $s_1, s_2, s_3, s_4, s_5, s_6, s_7, s_8$ are transmitted via Antenna #1 and Antenna #2, respectively, the signals are transmitted. Furthermore, $\tilde{x}_5, \tilde{x}_6, \tilde{x}_7, \tilde{x}_8$ corresponding to the data symbols $s_1, s_2, s_3, s_4, s_5, s_6, s_7, s_8$ are transmitted via Antenna #3 and Antenna #4, respectively. Further, all of the data symbols, $s_1, s_2, s_3, s_4, s_5, s_6, s_7, s_8$, are combined during a specified time slot and then transmitted. Preferably, a same MCS level is uniformly assigned to all of the data symbols.

As discussed, the STC scheme according to the embodiment of the present invention can be further explained with space-time coded matrix C. That is, space-time coding can be performed using the STC schemes of Equations 7, 11, 14, 17, 21, 24, 27, and 31. The aforementioned equations are examples of the STC schemes, and the STC matrix of these equations can be modified into a new or different STC matrix by a unitary matrix. That is, a unitary matrix can be multiplied to the STC matrix to form a different or a new STC matrix.

A unitary matrix, U, can be shown according to Equation 35.

$$U \times U^H = I, \det(U) = 1$$

[Equation 35]

If the STC matrix discussed in the embodiments of the present invention is referred to as C, the U matrix multiplied STC matrix can be expressed as follows.

$$det(C \times U) = det(C) det(U) = det(C) \quad \text{[Equation 36]}$$

In other words, if the unitary matrix is multiplied to the STC matrix, the determinant of the original STC matrix is unaffected or unchanged. As such, the performance of the original STC matrix is unchanged.

An example of modified STC matrix by multiplying the unitary matrix can be shown in Equation 37. Here, the unitary matrix is multiplied to the STC matrix of Equation 10.

$$C_{New}^{2 \times 1} = \frac{1}{\sqrt{4}} \begin{bmatrix} s_1 + s_2 & -s_1 + s_2 \\ s_1^* - s_2^* & s_1^* + s_2^* \end{bmatrix}, \quad \text{[Equation 37]}$$

$$U = \begin{pmatrix} 0 & 1 \\ 1 & 0 \end{pmatrix},$$

$$C_{New}^{2 \times 1} \times U = \frac{1}{\sqrt{4}} \begin{bmatrix} -s_1 + s_2 & s_1 + s_2 \\ s_1^* + s_2^* & s_1^* - s_2^* \end{bmatrix}$$

With respect to Equation 37, the determinants for $C_{New}^{2 \times 1}$, $C_{New}^{2 \times 1} \times U$ are as follows.

$$det(C_{New}^{2 \times 1}) = det\left( \frac{1}{\sqrt{4}} \begin{pmatrix} s_1 + s_2 & -s_1 + s_2 \\ s_1^* - s_2^* & s_1^* + s_2^* \end{pmatrix} \right) \quad \text{[Equation 38]}$$

$$= |s_1|^2 + |s_2|^2$$

$$det(C_{New}^{2 \times 1} \times U) = det\left( \frac{1}{2} \begin{pmatrix} s_1 + s_2 & -s_1 + s_2 \\ s_1^* - s_2^* & s_1^* + s_2^* \end{pmatrix} \begin{pmatrix} 0 & 1 \\ 1 & 0 \end{pmatrix} \right)$$

$$= det\left( \frac{1}{2} \begin{pmatrix} -s_1 + s_2 & s_1 + s_2 \\ s_1^* + s_2^* & s_1^* - s_2^* \end{pmatrix} \right)$$

$$= |s_1|^2 + |s_2|^2$$

As discussed, a unitary matrix can be multiplied to a specified STC matrix to make a modified matrix as shown as an example in Equation 38.

Figure 6:
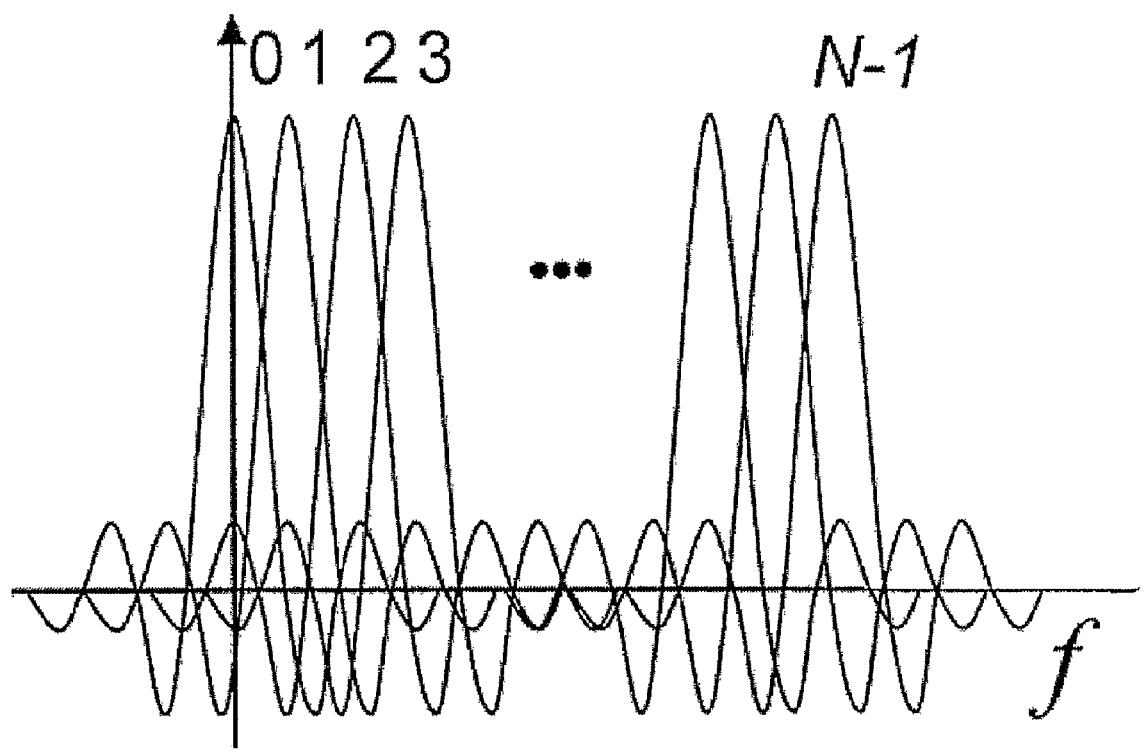
FIG. 6 illustrates subcarriers in an OFDM frequency domain.

With respect to the embodiments of the present invention, the weight values (also referred to as complex weights) of the space-time codes can be applied to an orthogonal frequency division multiplexing (OFDM) system. If the weight values of the STC are applied to the OFDM system, then different weight values can be applied based on frequency carrier index. FIG. 6 illustrates subcarriers in an OFDM frequency domain. Here, the system can be represented by N−1 number of subcarriers.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method of transmitting space-time coded data in a wireless communication system having a plurality of antennas, the method comprising:

allocating data symbols combined with complex weights to at least two transmit antennas of the plurality of antennas during at least one specified time slot; and transmitting the data symbols combined with complex weights to a receiving end via the at least two transmit antennas during the at least one specified time slot, wherein a sum of a power of the transmitted data symbols is the same for each of the at least two transmit antennas during a same time slot.

2. The method of claim 1, wherein the complex weights which are combined with the data symbols are the same when retransmitted.

3. The method of claim 1, wherein the complex weights which are combined with the data symbols are different when retransmitted.

4. The method of claim 1, wherein the complex weights are determined by the at least two transmit antennas which are assigned for transmitting the data symbols.

5. A method of transmitting space-time coded data in a wireless communication system having a plurality of antennas, the method comprising:

allocating data symbols to at least two transmit antennas of the plurality of antennas during at least one specified time slot; and transmitting the data symbols to a receiving end via the at least two transmit antennas during the at least one specified time slot, wherein the data symbols are combined with complex weights, wherein the data symbols are allocated to two transmit antennas during two time slots according to a space-time code matrix, C, which is expressed as $$C = \begin{bmatrix} w_1 s_1 + w_2 s_2 & -w_1 s_1 + w_2 s_2 \\ w_3 s_1^* - w_4 s_2^* & w_3 s_1^* + w_4 s_2^* \end{bmatrix}.$$

wherein $w_1$, $w_2$, $w_3$ and $w_4$ denote the complex weights, and wherein $s_1$ and $s_2$ denote the data symbols.

6. The method of claim 5, wherein the complex weights, $w_1$, $w_2$, $w_3$, $w_4$, have the same amplitude, and a sum of phases of $w_1$ and $w_3$ and a sum of phases of $w_2$ and $w_4$ are the same.

7. The method of claim 5, wherein the complex weights, $w_1$, $w_2$, $w_3$, $w_4$, have different amplitudes, and a sum of phases of $w_1$ and $w_3$ and a sum of phases of $w_2$ and $w_4$ are the same.

8. The method of claim 5, wherein the complex weights, $w_1$, $w_2$, $w_3$, $w_4$, are defined as $$w_1 = \frac{e^{j\theta_a}}{\sqrt{2(1+r^2)}}, \quad w_2 = \frac{re^{j\theta_b}}{\sqrt{2(1+r^2)}}, \quad w_3 = \frac{re^{j\theta_c}}{\sqrt{2(1+r^2)}},$$

$$w_4 = \frac{e^{j\theta_d}}{\sqrt{2(1+r^2)}}$$

in which r represents a real number and values of the phases are denoted as $\theta_a$, $\theta_b$, $\theta_c$, $\theta_d$ and j represents an imaginary unit.

9. A method of transmitting space-time coded data in a wireless communication system having a plurality of antennas, the method comprising:

allocating data symbols to at least two transmit antennas of the plurality of antennas during at least one specified time slot; and transmitting the data symbols to a receiving end via the at least two transmit antennas during the at least one specified time slot, wherein the data symbols are combined with complex weights, and wherein the data symbols are allocated to four transmit antennas of the plurality of antennas during two time slots according to a space-time code matrix, C, which is expressed as $$C = \begin{bmatrix} w_1\tilde{x}_1 + w_2\tilde{x}_2 & -w_1\tilde{x}_1 + w_2\tilde{x}_2 \\ w_3\tilde{x}_1^* - w_4\tilde{x}_2^* & w_3\tilde{x}_1^* + w_4\tilde{x}_2^* \\ w_1\tilde{x}_3 + w_2\tilde{x}_4 & -w_1\tilde{x}_3 + w_2\tilde{x}_4 \\ w_3\tilde{x}_3^* - w_4\tilde{x}_4^* & w_3\tilde{x}_3^* + w_4\tilde{x}_4^* \end{bmatrix},$$

wherein $\tilde{x}_1, \tilde{x}_2, \tilde{x}_3, \tilde{x}_4$ denote antenna transmit signals corresponding to the data symbols, and wherein $w_1, w_2, w_3, w_4$ denote the complex weights.

10. The method of claim 9,
wherein $\tilde{x}_1, \tilde{x}_2, \tilde{x}_3, \tilde{x}_4$ are defined as $\tilde{x}_1 = x_1^R + jx_3^I$, $\tilde{x}_2 = x_2^R + jx_4^I$, $\tilde{x}_3 = x_3^R + jx_1^I$, and $\tilde{x}_4 = x_4^R + jx_2^I$, respectively,
wherein R represents a real part number of a complex number,
wherein I represents an imaginary part number of the complex number,
wherein j represents an imaginary unit,
wherein $x_i = s_i e^{j\theta_r}$, and
wherein $s_i$ represents the data symbols.

11. The method of claim 9, wherein the complex weights, $w_1, w_2, w_3, w_4$, have the same amplitude, and a sum of phases of $w_1$ and $w_3$ and a sum of phases of $w_2$ and $w_4$ are the same, and
wherein a value of the phase is $\theta_r$, which is defined as $$\theta_r = \frac{1}{2}\tan^{-1}(2).$$

12. The method of claim 9, wherein the complex weights, $w_1, w_2, w_3, w_4$, are defined as $$w_1 = \frac{e^{j\theta_a}}{\sqrt{2(1+r^2)}},$$

$$w_2 = \frac{re^{j\theta_b}}{\sqrt{2(1+r^2)}},$$

$$w_3 = \frac{re^{j\theta_c}}{\sqrt{2(1+r^2)}},$$

$$w_4 = \frac{e^{j\theta_d}}{\sqrt{2(1+r^2)}},$$

in which r represents a real number and values of the phases are denoted as $\theta_a, \theta_b, \theta_c, \theta_d$ and j represents an imaginary unit.

13. An apparatus for transmitting space-time coded data in a wireless communication system having a plurality of antennas, the apparatus comprising:
a multiple antenna encoder for combining complex weights with data symbols and allocating the data symbols combined with complex weights to at least two transmit antennas of the plurality of antennas during at least one specified time slot; and
the plurality of antennas for transmitting the data symbols combined with complex weights to a receiving end via the at least two transmit antennas during the at least one specified time slot,
wherein a sum of a power of the transmitted data symbols is the same for each of the at least two transmit antennas during a same time slot.

14. The apparatus of claim 13, wherein the complex weights which are combined with the data symbols are the same when retransmitted.

15. The apparatus of claim 13, wherein the complex weights which are combined with the data symbols are different when retransmitted.

16. The apparatus of claim 13, wherein each complex weight is determined by the transmit antenna which is assigned for transmitting the corresponding data symbol.

17. An apparatus for transmitting space-time coded data in a wireless communication system having a plurality of antennas, the apparatus comprising:
a multiple antenna encoder for combining complex weights with data symbols and allocating the data symbols combined with complex weights to at least two transmit antennas of the plurality of antennas during at least one specified time slot; and
the plurality of antennas for transmitting the data symbols combined with complex weights to a receiving end via the at least two transmit antennas during the at least one specified time slot,
wherein the data symbols are allocated to two transmit antennas during two time slots according to a space-time code matrix, C, which is expressed as $$C = \begin{bmatrix} w_1 s_1 + w_2 s_2 & -w_1 s_1 - w_2 s_2 \\ w_3 s_1^* - w_4 s_2^* & w_3 s_1^* + w_4 s_2^* \end{bmatrix},$$

wherein $w_1, w_2, w_3$ and $w_4$ denote the complex weights, and
wherein $s_1$ and $s_2$ denote the data symbols.

18. The apparatus of claim 17, wherein the complex weights, $w_1, w_2, w_3, w_4$, have the same amplitude, and a sum of phases of $w_1$ and $w_3$ and a sum of phases of $w_2$ and $w_4$ are the same.

19. The apparatus of claim 17, wherein the complex weights, $w_1, w_2, w_3, w_4$, have different amplitudes, and a sum of phases of $w_1$ and $w_3$ and a sum of phases of $w_2$ and $w_4$, are the same.

20. The apparatus of claim 17, wherein the complex weights, $w_1, w_2, w_3, w_4$, are defined as $$w_1 = \frac{e^{j\theta_a}}{\sqrt{2(1+r^2)}},$$

$$w_2 = \frac{re^{j\theta_b}}{\sqrt{2(1+r^2)}},$$

$$w_3 = \frac{e^{j\theta_c}}{\sqrt{2(1+r^2)}},$$

$$w_4 = \frac{re^{j\theta_d}}{\sqrt{2(1+r^2)}},$$

in which r represents a real number and values of the phases are denoted as $\theta_a, \theta_b, \theta_c, \theta_d$ and j represents an imaginary unit.

* * * * *